Feb. 14, 1950
L. R. DE WITT
2,497,157
FILM MAGAZINE
Filed Feb. 25, 1948
4 Sheets-Sheet 1
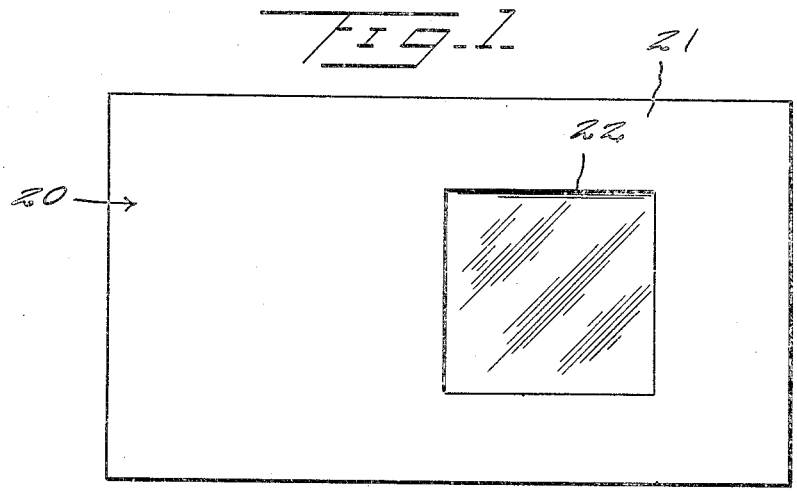
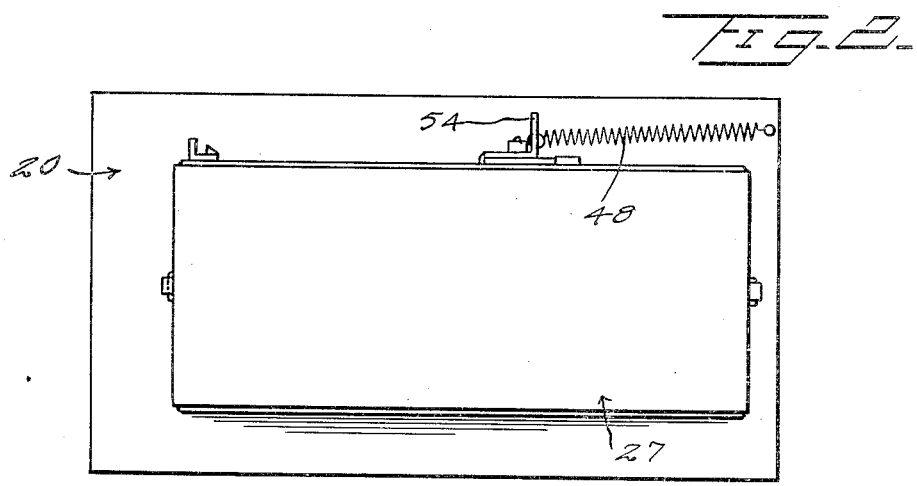
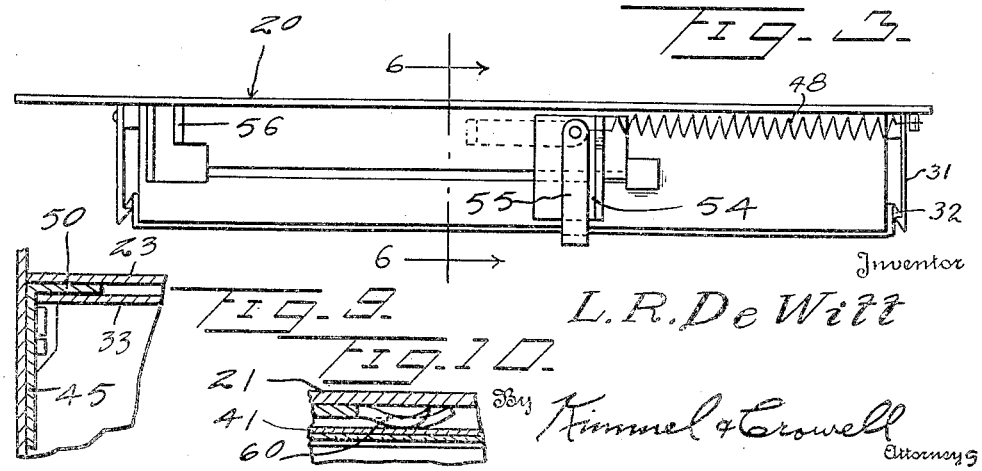
Inventor
L. R. De Witt
By Kimmel & Crowell
Attorneys Feb. 14, 1950     L. R. DE WITT     2,497,157
FILM MAGAZINE
Filed Feb. 25, 1948     4 Sheets-Sheet 2
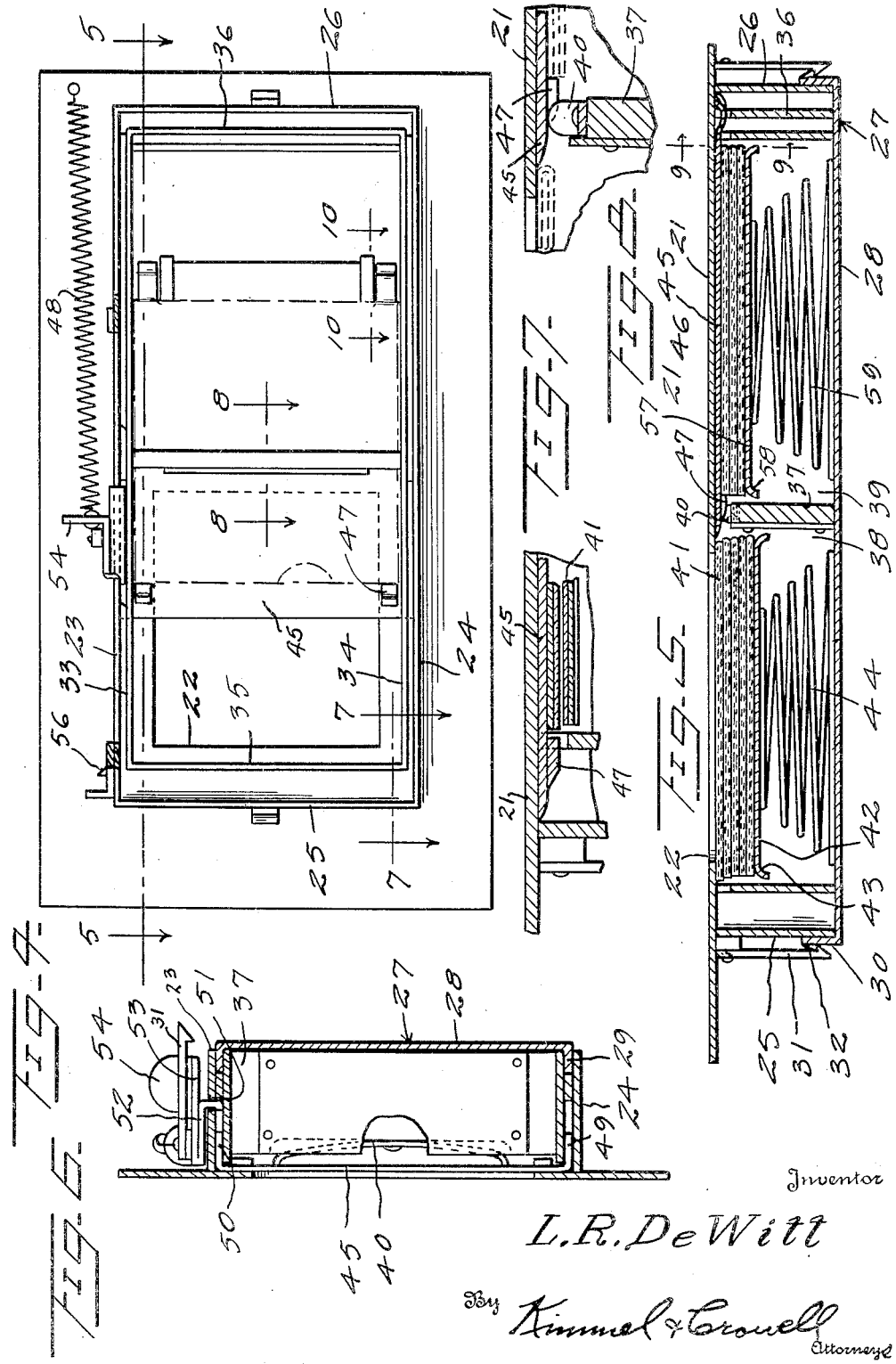
Inventor
L. R. DeWitt
By Kimmel & Crowell
Attorneys

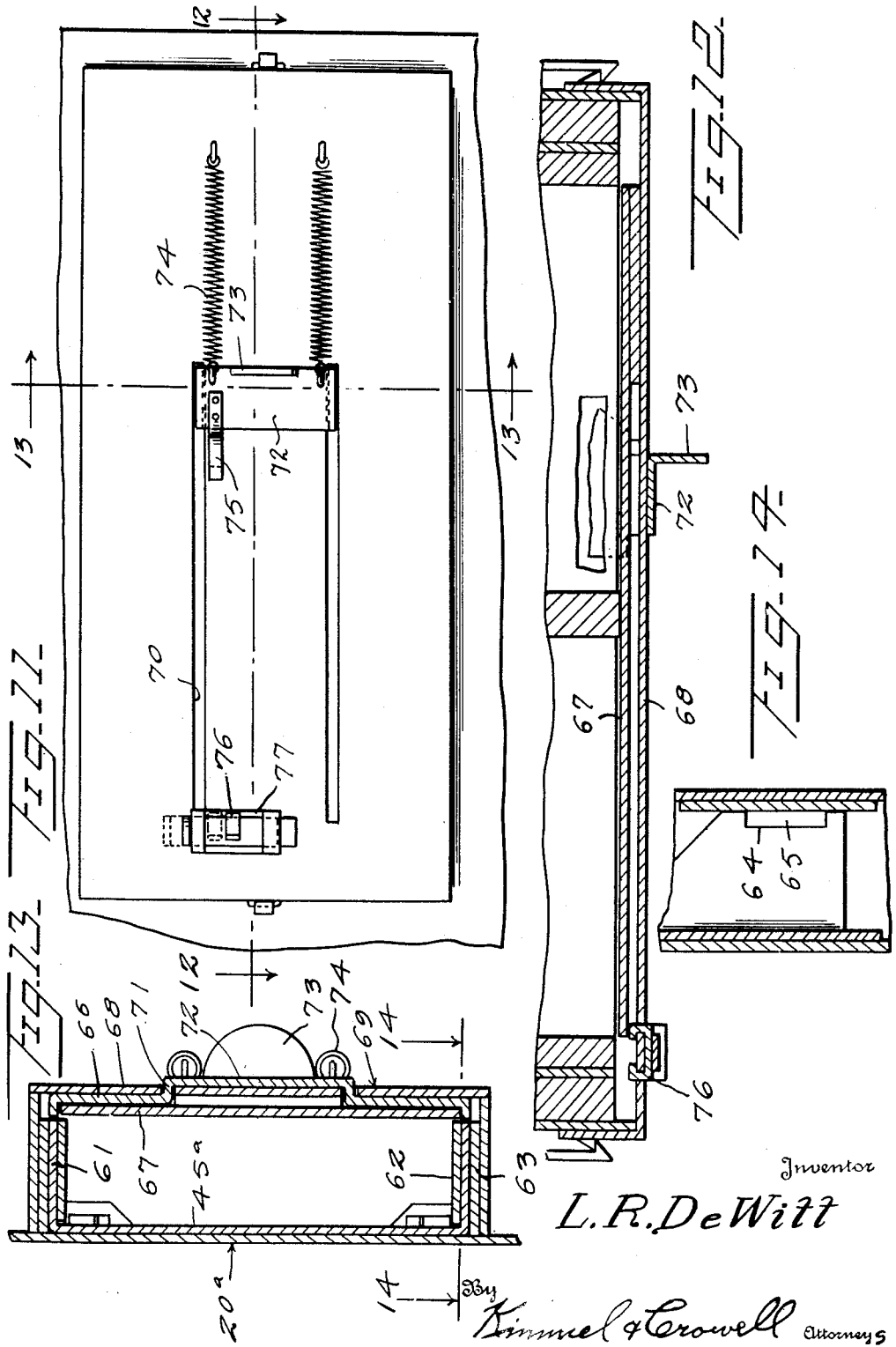

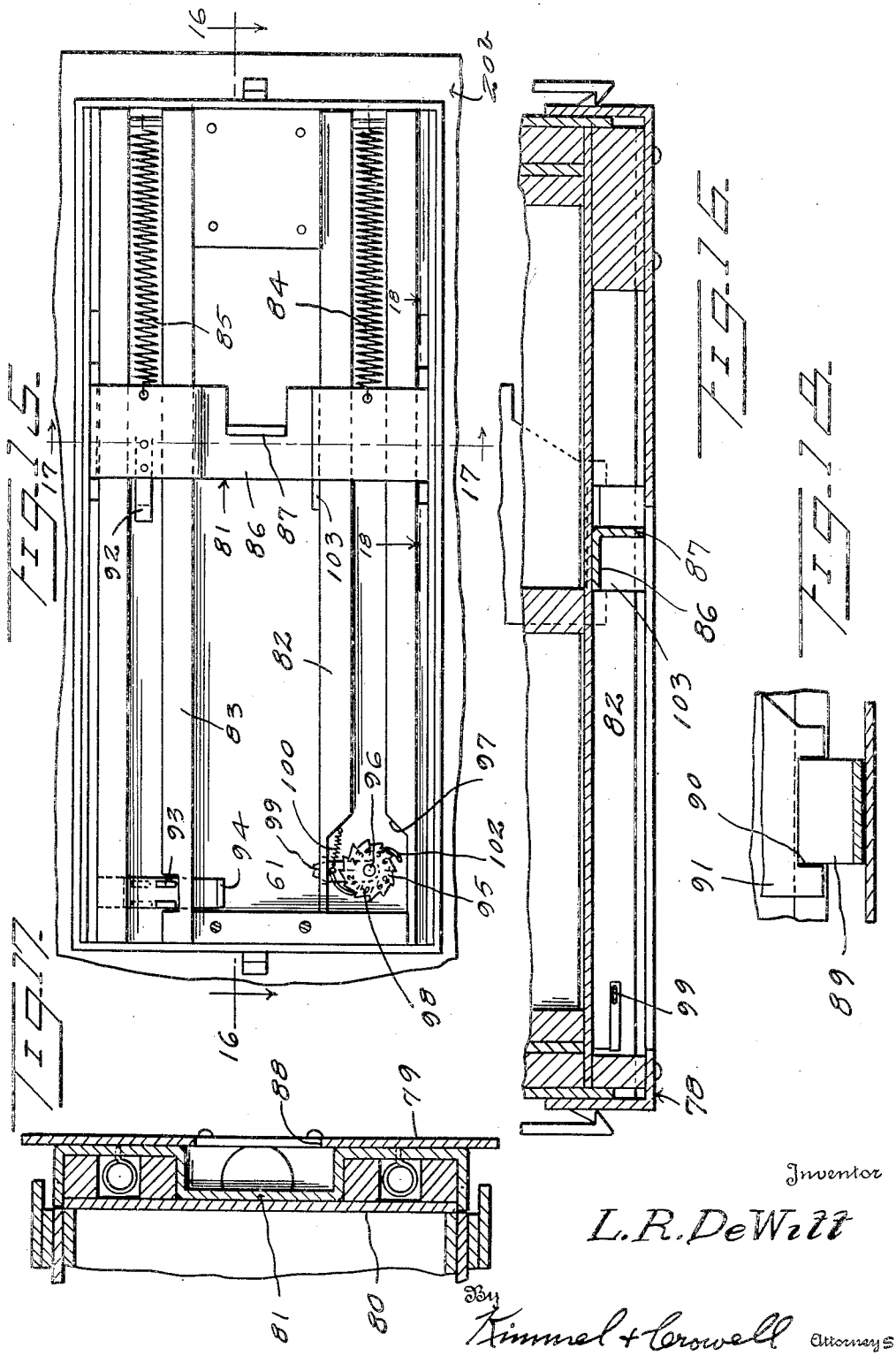

Patented Feb. 14, 1950

2,497,157

UNITED STATES PATENT OFFICE 2,497,157

FILM MAGAZINE

Lloyd R. De Witt, Mount Vernon, Ill.

Application February 25, 1948, Serial No. 10,879

3 Claims. (Cl. 95—19)

This invention relates to film magazines for cut films.

An object of this invention is to provide a film magazine which includes a housing adapted to be mounted on the back of a camera, the housing having a slide therein for selectively shifting an exposed film from the exposure chamber to the exposed chamber.

Another object of this invention is to provide a film magazine including an improved film shifting slide which is adapted to be latched in closed position relative to the exposure window so that unexposed films may be inserted into the exposure chamber with the emulsion sides facing the window.

A further object of this invention is to provide a film magazine which is constructed as an attachment for the back of a camera and which includes a magazine divided into an unexposed film chamber and an exposed film chamber, the unexposed film chamber being formed with a window opening confronting the lens, and the films being initially disposed in the unexposed film chamber and shiftable to the exposed film chamber from which the exposed film may be removed at any time before the complete loading has been exposed.

A further object of this invention is to provide a film magazine construction which can be easily loaded and unloaded and which includes metal holders for the films so that the films will not be scratched as they are moved from one chamber to the other.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a detailed front elevation of a film magazine constructed according to an embodiment of this invention.

Figure 2 is a detailed rear elevation of the device.

Figure 3 is a detailed side elevation of the device.

Figure 4 is a view similar to Figure 2 with the cover removed.

Figure 5 is a sectional view taken on the line 5—5 of Figure 4.

Figure 6 is a sectional view taken on the line 6—6 of Figure 3.

Figure 7 is a fragmentary sectional view taken on the line 7—7 of Figure 4.

Figure 8 is a fragmentary sectional view taken on the line 8—8 of Figure 4.

Figure 9 is a fragmentary sectional view taken on the line 9—9 of Figure 5.

Figure 10 is a fragmentary sectional view taken on the line 10—10 of Figure 4.

Figure 11 is a detailed rear elevation, partly broken away of a modified form of this invention.

Figure 12 is a fragmentary sectional view taken on the line 12—12 of Figure 11.

Figure 13 is a sectional view taken on the line 13—13 of Figure 11.

Figure 14 is a fragmentary sectional view taken on the line 14—14 of Figure 13.

Figure 15 is a detailed rear elevation, partly broken away, of another modification of this invention.

Figure 16 is a fragmentary sectional view taken on the line 16—16 of Figure 15.

Figure 17 is a fragmentary sectional view taken on the line 17—17 of Figure 15.

Figure 18 is a fragmentary sectional view taken on the line 18—18 of Figure 15.

Referring to the drawings and first to Figures 1 to 10, inclusive, the numeral 20 designates generally a housing which is formed of an inner plate or wall 21 having a window opening 22 therein adapted to be disposed in alignment with the lens of a camera. The housing 20 is formed of opposite side walls 23 and 24 and opposite end walls 25 and 26. The rear of the housing 20 is adapted to be closed by means of a cover 27 which is formed of a rear wall 28 having longitudinal flanges 29 which are engageable on the inner sides of the side walls 23 and 24. The cover 27 also includes end flanges 30 engageable over the outer sides of the end members 25 and 26 and the cover is releasably secured on the housing 20 by means of yieldable latch members 31 which engage keepers 32 carried by the end flanges 30. The housing 20 has mounted interiorly thereof inner side walls 33 and 35 which are spaced inwardly from the side walls 23 and 24 and end walls 35 and 36 are secured to the inner side walls 33 and 34. The provision of the inner housing formed by the side walls 33 and 34 and the end walls 35 and 36 provides for the sealing of the housing 20 against entrance of light when the cover 27 is in applied position.

A transversely extending partition 37 is secured between the inner side walls 33 and 34 and divides the interior of the housing into an exposure chamber 38 and an exposed chamber 39. The inner edge of the partition 37 is spaced from the wall or plate 21 as shown in Figure 8 and a bowed spring 40 is secured to the inner edge of the partition 37 and extends in the direction of the wall 21. A plurality of film holders 41 are adapted to be disposed in the exposure chamber 38 and a follower 42 formed with upturned opposite edges 43 is spring-pressed by means of a spiral spring 44 toward the inner wall 21 so as to hold the outermost film holder 41 against the wall 21 and in a position overlying the opening 22. The space between the inner edge of the partition 37 and the inner wall 21 is sufficient to provide for the sliding movement of one holder 41 one at a time from the exposure chamber 38 to the exposed chamber 49.

A holder shifting slide 45 is slidable in the housing 20 and includes a flat plate 46 which is formed at one edge thereof with lugs 47 which are adapted to engage the adjacent edge of a holder 41 which is in a position confronting the opening 22 so that movement of the shifter 45 to the right will move one holder 41 from the exposure chamber 38 to the exposed chamber 39. The slide or shifter 45 is movable between the partition 37 and the inner wall 21 and is spring-pressed to normally dispose the shifter or slide 45 to the right or in the exposed chamber 39 by means of a spring 48. The slide 45 is provided on one edge thereof with an outwardly extending flange 49 and on the opposite edge thereof with a flange 50. The flanges 49 and 50 engage in the space between the walls 24 and 34 and 23 and 33, respectively. The side wall 23 of the housing 20 is formed with a longitudinally extending slot 51 through which a substantially U-shaped member 52 slidably engages. The U-shaped member 52 is fixed relative to the flange 50 and the U-shaped member 52 has extending outwardly therefrom an arm 53 to which is secured a lug or finger 54 constituting an operator for the slide 45.

The arm 53 has pivoted thereto a latch member 55 which is selectively engageable with a keeper 56 carried by the housing 20 so that when it is desired to load the exposure chamber 38 the slide 45 may be latched in its window covering position to prevent light from passing through the window and exposing the foremost one of the films in the foremost holder 41. The exposed chamber 39 has mounted therein a spring-pressed follower 57 formed with reverted opposite edges 58 and the follower 57 is under the tension of a spiral spring 59 so that the follower 57 will constantly hold the film holders against the inner wall 21. The slide or shifter 45 has extending from the edge thereof opposite from the lugs 47 bowed fingers 60 which are adapted when the slide is in its forward position covering the opening 22 to hold the foremost film holder in exposed chamber 39 away from contact with the inner wall 21 and provide for the sliding movement of a succeeding film holder from the exposure chamber 38 in front of the foremost holder in exposed chamber 39.

Referring now to Figures 11 to 14, inclusive, there is disclosed a modified form of this invention. A housing 20a is provided which is similar to the housing 20 with the exception that the cover carries the operator for the film holder slide. The slide 45a is formed with relatively long side flanges 61 which engage between inner side walls 62 and outer side walls 63. The side flanges 61 are provided with notches 64 in their outer edge within which a lug 65 carried by a slide 66 is adapted to engage. The slide 66 is disposed between inner and outer walls 67 and 68 carried by a cover 69 and the outer wall 68 is provided with a pair of lengthwise extending slots 70 through which outwardly projecting extensions 71 formed on the slide 66 are adapted to loosely engage. The slide 66 includes an outer part 72 disposed on the outer side of the outer wall 68 and extending between the two slots 70. An outwardly extending finger or button 73 is carried by the outer part 72 and constitutes an operator for movement of the slide 66. The slide 66 is constantly urged to the right by means of a pair of springs 74 for constantly maintaining the slide 45a within the exposed chamber. The slide operating member 66 is adapted to be held in a position with the slide member 45 covering the window opening of the exposure chamber by means of a latch 75 which is engageable with a slidable keeper 76 engaging a similar guide member 77 secured to the outer side of the outer wall 68. In other respects the construction shown in Figures 11 to 14 is identical with that shown in Figures 1 to 10, inclusive.

Referring now to Figures 15 to 18, inclusive, there is disclosed another modification of this invention. The housing 20b has removably secured thereto a cover 78 and the cover 78 includes an outer wall 79, an inner wall 80 and a slide member 81. The inner wall 80 has fixed thereto pairs of longitudinally extending spaced bars 82 and 83 between which springs 84 and 85 are adapted to engage. The springs 84 and 85 are connected to the slide 81 and this slide 81 is formed with a centrally disposed inwardly offset portion 86 adapted to slidably bear against the outer side of the inner wall 80. A handle or operator 87 is secured to the offset portion 86 and the outer wall 79 is formed with an opening 88 through which a finger is adapted to be extended for engagement with the operator 87. The slide 81 is formed on the opposite edges thereof with an inwardly projecting flange 89 which is engageable in a notch 90 formed in an outwardly projecting flange 91 carried by the shifter for the film holder which is similar to the shifter 45. The slide 81 is adapted to be latched in its forward position by means of a latch member 92 which is fixed to the slide 81 and is engageable with a laterally shiftable keeper 93 which extends transversely of the parallel bars 83. The keeper 93 includes a finger or lug 94 disposed in the space between the innermost bars 82 and 83 so that the keeper 93 may be moved to either operative or released position. In order to provide a means whereby the user of this device will be able to determine the exact number of films which have been exposed and have been shifted from the exposure chamber to the exposed chamber, I have provided a ratchet wheel or counter 95 which is pivotally mounted on a pivot 96 and is disposed in an enlarged space 97 formed between the bars 82 at the forward ends of the latter. The ratchet wheel or counter 95 has indicia 98 on the outer side thereof and a pawl carrying lever 99 is pivotally mounted on the shaft or pivot 96 and is spring-pressed inwardly by means of a spring 100. The pawl carrying lever 99 has mounted thereon a spring-pressed pawl 101 which engages the teeth of the ratchet wheel 95 and a spring-pressed holding pawl 102 also engages the ratchet 95 so as to prevent reverse rotation of the ratchet 95. A forwardly projecting lug 103 is carried by the slide 81 on the inner side of the inner one of the bars 92 and is adapted to engage the inwardly projecting end of the pawl carrier 99 when the slide 81 is moved forwardly.

In the use and operation of this device the unexposed films in the holders 41 are disposed in the exposure chamber 38, the cover 27 being removed and preferably the films and holders are inserted in the exposure chamber 38 in a dark room. When one film has been exposed this film may be shifted to the exposed chamber 39 by forward movement of the slide 45 to the left as viewed in Figures 4 and 5. The lug 47 will engage the outer edge of the foremost film holder 41 and the slide may thereupon be released so that the spring 48 will return the slide 45 to the exposed chamber 39, moving therewith the foremost one of the holders 41 with the exposed film. In the event it is desired to develop any of the exposed films in the exposed chamber 39, the cover 27 may be removed in a dark room and the exposed films removed from the chamber 39. The unexposed films in the exposure chamber 38 will be left in this chamber until they have been exposed and progressively shifted by means of the slide 45 to the exposure chamber 38.

I claim:

1. A film magazine comprising a housing for mounting on the rear of a camera, said housing having an inner wall formed with a window for exposing a film engaging across said window, a transverse partition in said housing dividing said housing into an exposure chamber and an exposed film chamber, a film shifting plate slidable in said housing, said plate including outwardly extending flanges on the opposite longitudinal edges thereof, a cover removably mounted on the outer end of said housing, a spring-pressed plate actuator slidably carried by said cover, correlated coupling means carried by said actuator and said flanges whereby said plate will be coupled with said actuator when said cover is in applied position, said actuator being normally urged to dispose said plate in said exposed film chamber, and spring-pressed followers disposed in each chamber.

2. A film magazine comprising a housing for mounting on the rear of a camera, said housing having an inner wall formed with a window for exposing a film engaging across said window, a transverse partition in said housing dividing said housing into an exposure chamber and an exposed chamber, a film shifting plate slidable in said housing, said plate including outwardly extending flanges on the opposite longitudinal edges thereof, a cover removably mounted on the outer end of said housing, a spring-pressed plate actuator slidably carried by said cover, correlated coupling means carried by said actuator and said flanges whereby said plate will be coupled with said actuator when said cover is in applied position, spring-pressed followers disposed in each chamber, and releasable latch means for holding said plate in said exposure chamber.

3. A film magazine comprising a housing for mounting on the rear of a camera, said housing having an inner wall formed with a window for exposing a film engaging across said window, a transverse partition in said housing dividing said housing into an exposure chamber and an exposed chamber, a film shifting plate slidable in said housing, said plate including outwardly extending flanges on the opposite longitudinal edges thereof, a cover removably mounted on the outer end of said housing, a spring-pressed plate actuator slidably carried by said cover, correlated coupling means carried by said actuator and said flanges whereby said plate will be coupled with said actuator when said cover is in applied position, spring-pressed followers disposed in each chamber, counting means, and means carried by said slide engageable with said counting means to progressively actuate said counting means upon movement in one direction of said slide.

LLOYD R. DE WITT.

REFERENCES CITED

The following references are of record in the file of this patent:

UNITED STATES PATENTS

| Number | Name | Date |
| --- | --- | --- |
| 477,377 | Sault | June 21, 1892 |

FOREIGN PATENTS

| Number | Country | Date |
| --- | --- | --- |
| 21,873 | Great Britain | Nov. 1, 1899 |
| 1,149 | France | Mar. 10, 1903 |
|  | (Addition to No. 304,908) | |